United States Patent
Yang et al.

(10) Patent No.: US 11,153,371 B2
(45) Date of Patent: Oct. 19, 2021

(54) SYSTEMS AND TECHNIQUES FOR UTILIZING RESOURCE AWARE QUEUES AND/OR SERVICE SHARING IN A MULTI-SERVER ENVIRONMENT

(71) Applicant: salesforce.com, inc., San Francisco, CA (US)

(72) Inventors: Ronald Yang, Cupertino, CA (US); Vijayanth Devadhar, Fremont, CA (US); Manoj Cheenath, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 239 days.

(21) Appl. No.: 16/568,149

(22) Filed: Sep. 11, 2019

(65) Prior Publication Data

US 2020/0005190 A1    Jan. 2, 2020

Related U.S. Application Data

(63) Continuation of application No. 14/953,672, filed on Nov. 30, 2015, now Pat. No. 10,452,997, which is a
(Continued)

(51) Int. Cl.
*G06N 20/00* (2019.01)
*H04L 29/08* (2006.01)
(Continued)

(52) U.S. Cl.
CPC ........ *H04L 67/1008* (2013.01); *G06F 9/5011* (2013.01); *G06F 16/2455* (2019.01);
(Continued)

(58) Field of Classification Search
CPC ........... H04L 67/1008; H04L 29/08072; H04L 43/0876; H04L 47/125; H04L 49/90;
(Continued)

(56) References Cited

U.S. PATENT DOCUMENTS 5,577,188 A    11/1996  Zhu
5,608,872 A    3/1997   Schwartz et al.
(Continued)

OTHER PUBLICATIONS

Final Office Action for U.S. Appl. No. 16/259,964 dated Apr. 6, 2020, 5 pages.
(Continued)

*Primary Examiner* — Abdulkader M Alriyashi
(74) *Attorney, Agent, or Firm* — Jaffery Watson Mendonsa & Hamilton LLP

(57) ABSTRACT

Systems and techniques for utilizing resource aware queues and/or service sharing in a multi-server environment. According to an example, an application server employs a traffic light metaphor to represent a utilization level of resources of the application server by associating a traffic light with each resource. A mapping is maintained that associates service requests with corresponding sets of affected traffic lights. A deferred queue is maintained for each traffic light to facilitate throttling of service requests directed to the application server that involve a resource that is under pressure. Responsive to receiving a service request directed to the application server, the service request is added directly or indirectly to one of multiple queues maintained in front of the application server based on a priority associated with the service request. Service requests are serviced from the queues in accordance with a priority associated with the queues.

20 Claims, 6 Drawing Sheets

Related U.S. Application Data continuation of application No. 13/295,644, filed on Nov. 14, 2011, now Pat. No. 9,201,696.

(60) Provisional application No. 61/421,989, filed on Dec. 10, 2010.

(51) Int. Cl.
  *H04L 12/861* (2013.01)
  *G06F 16/2455* (2019.01)
  *G06F 9/50* (2006.01)
  *H04L 12/26* (2006.01)
  *H04L 12/803* (2013.01)

(52) U.S. Cl.
  CPC ....... *G06N 20/00* (2019.01); *H04L 29/08072* (2013.01); *H04L 43/0876* (2013.01); *H04L 47/125* (2013.01); *H04L 49/90* (2013.01); *H04L 67/10* (2013.01); *H04L 67/1002* (2013.01); *H04L 67/1014* (2013.01); *H04L 69/329* (2013.01); *G06F 2209/5019* (2013.01)

(58) Field of Classification Search
  CPC . H04L 67/10; H04L 67/1002; H04L 67/1014; H04L 69/329; G06F 16/2455; G06F 9/5011; G06F 2209/5019
  See application file for complete search history.

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,091,709 A | 7/2000 | Harrison et al. | |
| 6,092,083 A | 7/2000 | Brodersen et al. | |
| 6,128,279 A | 10/2000 | O'Neil et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,463,454 B1 * | 10/2002 | Lumelsky | G06F 9/5083 |
| | | | 718/105 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,850,953 B1 | 2/2005 | Deshpande et al. | |
| 6,877,034 B1 | 4/2005 | Machin et al. | |
| 7,062,556 B1 | 6/2006 | Chen et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 7,669,051 B2 | 2/2010 | Redlich et al. | |
| 8,159,961 B1 | 4/2012 | Rai et al. | |
| 8,160,056 B2 | 4/2012 | Merwe et al. | |
| 8,176,563 B2 | 5/2012 | Redlich et al. | |
| 8,200,527 B1 | 6/2012 | Thompson et al. | |
| 8,290,995 B1 * | 10/2012 | Hu | H04L 67/322 |
| | | | 707/822 |
| 8,639,563 B2 | 1/2014 | Angell et al. | |
| 8,755,297 B2 | 6/2014 | Kalavade | |
| 8,880,640 B2 | 11/2014 | Graham et al. | |
| 9,026,624 B2 | 5/2015 | Gusev et al. | |
| 9,183,560 B2 | 11/2015 | Abelow | |
| 9,311,499 B2 | 4/2016 | Redlich et al. | |
| 9,672,474 B2 | 6/2017 | Dirac et al. | |
| 10,142,204 B2 | 11/2018 | Nickolov et al. | |
| 10,192,169 B2 | 1/2019 | Gusev et al. | |
| 10,608,911 B2 | 3/2020 | Nickolov et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0041167 A1 | 2/2003 | French et al. | |
| 2003/0041238 A1 | 2/2003 | French et al. | |
| 2003/0066061 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0177162 A1 | 9/2003 | Staiger et al. | |
| 2003/0187921 A1 | 10/2003 | Diec | |

(56) References Cited

U.S. PATENT DOCUMENTS

| | | |
|---|---|---|
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0172629 A1 | 9/2004 | Tene et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0075917 A1 | 4/2005 | Flores et al. |
| 2005/0091098 A1 | 4/2005 | Brodersen et al. |
| 2005/0138110 A1 | 6/2005 | Redlich et al. |
| 2006/0268764 A1 | 11/2006 | Harris |
| 2007/0074208 A1 | 3/2007 | Ling et al. |
| 2007/0089111 A1 | 4/2007 | Robinson et al. |
| 2008/0059384 A1 | 3/2008 | Eglen et al. |
| 2008/0062891 A1 | 3/2008 | Merwe et al. |
| 2008/0114628 A1 | 5/2008 | Johnson et al. |
| 2008/0273591 A1 | 11/2008 | Brooks et al. |
| 2008/0281610 A1 | 11/2008 | Yoshida et al. |
| 2008/0320001 A1 | 12/2008 | Gaddam |
| 2009/0172035 A1 | 7/2009 | Lessing et al. |
| 2009/0177744 A1 | 7/2009 | Marlow et al. |
| 2009/0178144 A1 | 7/2009 | Redlich et al. |
| 2009/0193121 A1* | 7/2009 | Shin .................. G06F 9/5011 709/225 |
| 2009/0313067 A1 | 12/2009 | Costa et al. |
| 2010/0025565 A1 | 2/2010 | Benic et al. |
| 2010/0125565 A1 | 5/2010 | Burger et al. |
| 2011/0010236 A1 | 1/2011 | Trillana |
| 2011/0184789 A1 | 7/2011 | Kirsch |
| 2012/0036552 A1 | 2/2012 | Dare et al. |
| 2012/0117404 A1 | 5/2012 | Lorch et al. |
| 2012/0129517 A1 | 5/2012 | Fox et al. |
| 2012/0151062 A1 | 6/2012 | Gusev et al. |
| 2013/0006987 A1 | 1/2013 | Stévenne |
| 2013/0024511 A1 | 1/2013 | Dunn et al. |
| 2013/0030873 A1 | 1/2013 | Davidson |
| 2013/0305169 A1 | 11/2013 | Gold |
| 2013/0316724 A1 | 11/2013 | Saeedi et al. |
| 2013/0339099 A1 | 12/2013 | Aidroos |
| 2014/0007183 A1 | 1/2014 | Qureshi et al. |
| 2014/0199962 A1 | 7/2014 | Mohammed et al. |
| 2014/0323158 A1 | 10/2014 | Wormald et al. |
| 2014/0365283 A1 | 12/2014 | Stenneth |
| 2014/0378091 A1 | 12/2014 | Irwin et al. |
| 2015/0120587 A1 | 4/2015 | Bramel et al. |
| 2015/0134693 A1 | 5/2015 | Chan et al. |
| 2015/0379427 A1 | 12/2015 | Dirac et al. |
| 2015/0379428 A1 | 12/2015 | Dirac et al. |
| 2016/0086108 A1 | 3/2016 | Abelow |
| 2016/0094414 A1 | 3/2016 | Merenda et al. |
| 2017/0034023 A1 | 2/2017 | Nickolov et al. |

OTHER PUBLICATIONS

Notice of Allowance for U.S. Appl. No. 14/805,056 dated Apr. 28, 2020, 7 pages.

Notice of Allowance for U.S. Appl. No. 16/259,964 dated Jun. 22, 2020, 7 pages.

A Study and Performance Evaluation of the Multi-Tenant Data Tier Design Patterns for Service: Oriented Computing Zhi Hu Wang, Chang Jie Guo, Bo Gao, Wei Sun, Zhen Zhang, Wen Hao An, Published: 2008.

Alternatives for Scheduling Virtual Machines in Real-Time Embedded Systems Robert Kaiser, Published: 2008.

Barak et al. (A Distributed Load-balancing Policy for a Multicomputer, Sep. 1985, dl.acm.org).

Crossbroker: A Grid Metascheduler for Interactive and Parallel Jobs Enol Fernandez, Andres Cencerrado Elisa Heymann, Miquel A. Senar, Published: 2008.

Final Office Action for U.S. Appl. No. 13/270,775 dated Aug. 5, 2016, 12 pages.

Final Office Action for U.S. Appl. No. 13/270,775 dated Oct. 16, 2014, 9 pages.

Final Office Action for U.S. Appl. No. 13/270,775 dated Sep. 29, 2015, 9 pages.

Final Office Action for U.S. Appl. No. 13/276,531 dated Sep. 9, 2014, 10 pages.

Final Office Action for U.S. Appl. No. 14/805,056 dated Apr. 24, 2018, 5 pages.

Final Office Action for U.S. Appl. No. 14/805,056 dated Dec. 12, 2018, 6 pages.

Final Office Action for U.S. Appl. No. 14/805,056 dated Jan. 14, 2020, 12 pages.

Final Office Action for U.S. Appl. No. 14/805,056 dated May 8, 2017, 6 pages.

Final Office Action for U.S. Appl. No. 14/953,672 dated Aug. 28, 2018, 13 pages.

Final Office Action for U.S. Appl. No. 14/953,672 dated Jun. 29, 2017, 13 pages.

Final Office Action for U.S. Appl. No. 14/953,672 dated Oct. 20, 2016, 18 pages.

Java newbie question: richer java subprocesses, gatoatigrado, Alain O'Dea et al., Published: Jun. 1, 2009-Dec. 11, 2012; Portion relied upon: Aug. 3, 2010.

JavaInvoke allows you to spawn additional Java VMs during testing Ari Gesher, Published: Jul. 28, 2009.

List: groovy-dev; Subject: [groovy-dev] Groovyc Ant task—joint compiler non-fork mode Russel Winder, Jochen Theodorou, Published: Jan. 18, 2008.

Non-Final Office Action for U.S. Appl. No. 14/703,682 dated Apr. 5, 2018, 6 pages.

Non-Final Office Action for U.S. Appl. No. 13/270,775 dated Apr. 3, 2015, 9 pages.

Non-Final Office Action for U.S. Appl. No. 13/270,775 dated Apr. 7, 2016, 11 pages.

Non-Final Office Action for U.S. Appl. No. 13/270,775 dated Apr. 9, 2014, 11 pages.

Non-Final Office Action for U.S. Appl. No. 13/276,531 dated Mar. 6, 2014, 9 pages.

Non-Final Office Action for U.S. Appl. No. 14/805,056 dated Aug. 10, 2018, 6 pages.

Non-Final Office Action for U.S. Appl. No. 14/805,056 dated Dec. 5, 2017, 11 pages.

Non-Final Office Action for U.S. Appl. No. 14/805,056 dated Jun. 27, 2019, 10 pages.

Non-Final Office Action for U.S. Appl. No. 14/953,672 dated Apr. 8, 2016, 18 pages.

Non-Final Office Action for U.S. Appl. No. 14/953,672 dated Dec. 15, 2017, 14 pages.

Non-Final Office Action for U.S. Appl. No. 14/953,672 dated Feb. 7, 2017, 11 pages.

Non-Final Office Action for U.S. Appl. No. 14/953,672 dated Feb. 7, 2019, 12 pages.

Non-Final Office Action for U.S. Appl. No. 16/259,964 dated Nov. 18, 2019, 8 pages.

Notice of Allowance for U.S. Appl. No. 14/703,682 dated Sep. 19, 2018, 7 pages.

Notice of Allowance for U.S. Appl. No. 13/276,531 dated Jan. 5, 2015, 7 pages.

Notice of Allowance for U.S. Appl. No. 14/953,672 dated Aug. 23, 2019, 18 pages.

(56) References Cited

OTHER PUBLICATIONS

Oracle Application Server Forms Services Deployment Guide 10g Release 2 (10.1.2) Orlando Cordero, Published: 2005.

Server virtualization in autonomic management of heterogeneous workloads Malgorzata Steinder, Ian Whalley, David Carrerat, Ilona Gawedat and David Chess, Published: 2007.

Virtualizing METACenter Resources Using Magrathea Jiri Denemark, Miroslav Ruda, Ludek Matyska Published: 2007.

VSched: Mixing Batch and Interactive Virtual Machines Using Periodic Real-time Scheduling Bin Lin Peter A. Dinda, Published: 2005.

\* cited by examiner

SYSTEMS AND TECHNIQUES FOR UTILIZING RESOURCE AWARE QUEUES AND/OR SERVICE SHARING IN A MULTI-SERVER ENVIRONMENT

CLAIM OF PRIORITY

This application is a continuation of U.S. patent application Ser. No. 14/953,672, filed Nov. 30, 2015, which is a continuation of U.S. patent application Ser. No. 13/295,644, filed Nov. 14, 2011, now U.S. Pat. No. 9,201,696, issued Dec. 1, 2015, which is related to U.S. Provisional Application No. 61/421,989, filed Dec. 10, 2010. All of the foregoing applications are hereby incorporated by reference in their entirety for all purposes.

TECHNICAL FIELD

Embodiments of the invention relate to management of service requests in a multi-server environment.

BACKGROUND

Application servers typically have a finite connection pool (e.g., about 20 connections per node), finite virtual machine memory, a finite number of processor cores, etc. For every incoming request, one thread may come into play and start processing. However, while there may be 200 threads, this does not mean that an application server can handle 200 simultaneous requests. For many servers, at about 25% of maximum threads, (e.g., approximately 50 concurrent requests), the server may run out of one or more of the resources and start falling over. Currently, there may also be some code that prevents a load balancer from sending additional requests to a server that is deemed unhealthy. This works to some degree, but does not adequately protect all resources.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
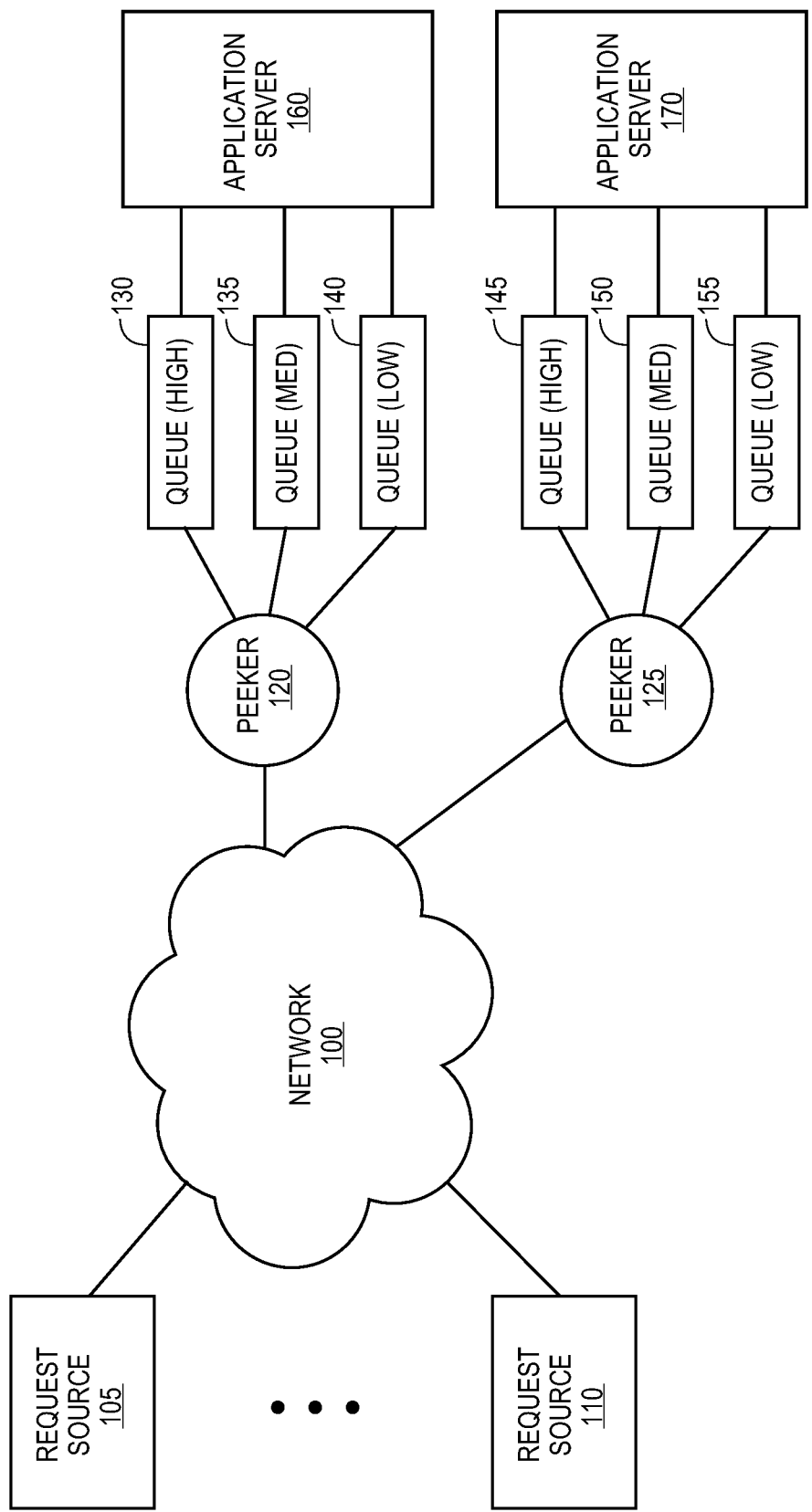
FIG. 1 is a block diagram of one embodiment of a system that may receive requests and prioritize those requests with one or more queues.

In the following description, numerous specific details are set forth. However, embodiments of the invention may be practiced without these specific details. In other instances, well-known circuits, structures and techniques have not been shown in detail in order not to obscure the understanding of this description.

In one embodiment, incoming requests are not processed synchronously. A request is analyzed to gather metadata, for example, organization type (orgType), request type (requestType), and/or priority, etc. In one embodiment, a thread that analyzes the metadata (aka "peeker thread" or "peeking thread") may create an object (e.g., encapsulating the request metadata, socket & other context) and queue the object for serviced by an application. Once the object is enqueued, the thread may analyze subsequent requests. In one embodiment, the queue of request metadata is monitored by a thread pool of worker threads. The worker threads may be sensitive to resource availability and pull requests from a queue if there is a reasonable chance of processing the request without falling over. If there are more requests than the server could handle, the requests may be queued up instead of bringing down the server.

In one embodiment, the worker threads may be sensitive to one or more of the following resources: database node processor(s), a connection pool slack, virtual machine (VM) memory, application server processor, and/or I/O rates (both on application server and the database). The sensitivity mechanisms for the queues may be similar to a traffic light architecture. In one embodiment, for the resources listed above, the database node may be a globally scoped resource constraint. That means if it indicates red on one node on an app server, it may do so on all app servers. Traffic lights that measure application server specific resources are locally scoped and their values are meaningful locally only. Details of the traffic light concept are provided below.

In one embodiment, a queue worker (e.g., application) that picks a request reads the rest of the request data from the socket and then processes the request. This means that the request sits in the network layer while it is waiting for its turn. Doing so may avoid reading and storing the request in application server memory (a scarce resource) or disk (a slow resource). In one embodiment, the peeking thread may be part of the worker thread, or, in an alternate embodiment, the peeking thread may be separate from the worker thread.

As discussed above, one or more queues may be utilized from which worker threads may acquire work and process the corresponding request. Various alternatives to provide this functionality are provided below. In one embodiment, each incoming request has a priority assigned to it. Priorities may be based on, for example, resource requirements corresponding to the request. Some requests may be computationally, or otherwise resource, expensive while other requests are less expensive. Priorities may also be determined based on an organization from which a request is received, quotas associated with the organization, etc.

As another example, priority can be based on recent analysis regarding the relative cost of request. For example, if requests from a certain organization have become more expensive recently, those requests may be assigned a lower priority than they would otherwise get. This may provide better overall performance. As another example, a list may be maintained that can be use to track certain request types or organizations and provide lower priorities for these requests. Other strategies may also be used to assign priorities to requests.

FIG. 1 is a block diagram of one embodiment of a system that may receive requests and prioritize those requests with one or more queues. The example of FIG. 1 provides two request sources and two applications that may service requests; however, any number of request sources and applications may be supported.

Network 100 may be any type of network that provides connections between request sources 105 and 110 and applications 160 and 170. Network 100 can be, for example, the Internet, a local area network (LAN), and/or any combination of networks and subnetworks. Request sources 105 and 110 operate to request services and/or resources from applications 160 and 170. Request sources 105 and 110 can be, for example, computer systems running browser applications that allow a user thereof to interact with applications 160 and 170.

Peeker 120 and peeker 125 may be threads running on or more servers coupled to receive requests from network 100. In one embodiment, peeker 120 and peeker 125 are provided as part of a multitenant environment that provides responses to incoming request. Various embodiments and features of example multitenant environments are provided below.

Peeker 120 and 125 operate as described above to analyze metadata corresponding to requests received from network 100. Based on the results of the metadata analysis, peeker 120 and peeker 125 operate to assign an object including the metadata to a queue feeding an application. In the example of FIG. 1, peeker 120 feeds three queues: high queue 130, medium queue 135 and low queue 140. Similarly, in the example of FIG. 1, peeker 125 feeds three queues: high queue 145, medium queue 150 and low queue 155. In alternate embodiments, a different number of queues may be utilized in a similar manner.

As discussed above, the peeker threads analyze metadata contained in the request to perform an analysis used to select the appropriate queue. Metadata that may be used by the peeker threads may include, for example, organization information related to the request (e.g., organization identifier, organization category, organization type), request information (e.g., request type, request size, associated requests), priority information, and/or resource information, etc.

In one embodiment, objects including the metadata are placed in the appropriate queue by the peeker threads. In alternate embodiments, the requests may be placed in the queues by the peeker threads. Applications 160 and 170 operate to service requests from the queues configured to store requests for the respective applications. In some embodiments, discussed in more detail below, applications may retrieve requests from queues for other applications.

In one embodiment, requests may be removed from based or priority or in a strict FIFO or modified FIFO strategy. In another embodiment, requests may be removed from the queues based on priority of the queue and length of the queue. In another embodiment, organization-specific virtual queues may be maintained and serviced in a round robin manner. Request queues may be subdivided into organization specific virtual queues. The applications may walk the queues in organization level round robin manner.

Every queuing implementation above may be sensitive to resource availability. In one embodiment, the queues may be partitioned based on server or application nodes. In another embodiment, a cost predictor engine may be utilized. With the cost predictor engine, the queues may not be walked in strict order, but the high cost requests that are deemed too expensive to process under current conditions may be skipped.

In one embodiment, application severs may be able to service requests from queues for other application servers. For example, application server 170 may service requests from one or more of queues 130, 135 and 140 depending on current conditions. Several alternatives to this work sharing are described below.

In one embodiment, application servers may maintain a list of "healthy" application servers to which requests can be sent when the server has reached a workload threshold. In one embodiment, this is triggered when locally scoped traffic lights indicate red and the application server chooses not to process the queue locally.

In another embodiment, each application server may have, for example, 1-4 "buddies" and the application server may poll its buddies when the application server has spare cycles (front runner). One advantage of this model is that the application server only gets what it wants to process. In one embodiment, a server may trigger a push from a "unhealthy" application server, instead of doing a pull from all "healthy" app servers even in steady state.

In another embodiment, a centralized queue, or set of queues, may be maintained to service requests to all application servers. These queues may operate as described above with priorities and request objects, but may function for all application servers rather than for just one application server.

In one embodiment, the queue structures utilize queue depth/wait time thresholds, beyond which the queue may not accept any more requests. This may facilitate fast failure instead of waiting for a long time and then timing out. In one embodiment, when an object is popped off the queue, the worker thread may report queue statistics (e.g., queue waiting times, processing times) to a statistics layer or to a log record. These can be used to measure the quality of service and be utilized to make corresponding adjustments.

In one implementation, the queue(s) may be resource aware. The queue(s) may utilize traffic light mechanisms and may be able to prevent working or slow down working on requests that use the resources under pressure. In this and other embodiments, the queue may be priority aware, with, for example, a pluggable priority finder module, the queue should efficiently deal with requests that cannot be processed for resource reasons, the queue has the ability to set an expiry date on a request and fail the request after the expiry date, the queue has an ability to hand off any deferred requests to a third party, the queue should be able provide the current queue depth, the queue should be able to increase worker thread counts as needed and also should be able to time-out idling threads.

In one embodiment, a JAVA PriorityBlockingQueue may be utilized to implement the underlying storage for queues. For example, a thread pool based on ThreadPoolExecutor may monitor the queue. The thread pool may have, for example, an initial size of 10 and can grow to 200 threads. In one embodiment, the queue may use the supplied Comparator object to figure out the priority of the requests. This means, the determination of the priority is done at insertion time and the value is not stored as part of the payload. Higher priority requests can starve or result in a denial of service (DoS) for lower priority requests. Other queue implementations may also be supported.

In one embodiment, the queue(s) may be sensitive to traffic lights. One or more measurable resource may have a traffic light monitoring it. In one embodiment, the traffic lights may be monitored using a pinger thread that stores the result in a map. This may facilitate quick state lookup upon enqueue and dequeue of requests. The queue(s) may use TrafficLightFinderinterface to match requests to affected traffic lights. This behavior may be modified, for example, by plugging in different implementations of this interface.

In one embodiment, for every traffic light supplied at queue construction time, queue may maintain a deferred queue of requests. Deferred queues are not monitored by thread pools. They are a place to store the request until there are enough resources to process the request. Deferred queues also use the notion of "priority" and may use the same Comparator as the active queue to order the requests. Requests may be on the deferred queue either during enqueue or after dequeue if the traffic light conditions warrant. Traffic light pinger thread may move requests from deferred queues to active queues when it notices a traffic light is no longer red.

Under certain conditions, there is potential for request to be stuck on deferred queue permanently or for extended periods of time. This may be addressed by not allowing requests to be stored in the deferred queue if the length of the deferred queue is over a pre-selected threshold. These requests may be failed immediately. Alternatively, a secondary thread may be utilized to analyze the request waiting times on the deferred queue and may fail requests if waiting times have exceeded a pre-selected threshold.

In one embodiment, upon enqueue of a request, the queue may look up the traffic lights for that request and check if any of them are in 'red' state. If yes, the request is put in the deferred queue for the first traffic light that indicated red.

Incoming requests may or may not have an organization identifier in the header. In one embodiment, if they do have, then a node to which they are headed can be identified and the specific connection pool and database processor traffic lights may be applied.

In one embodiment, one or more of the following statistics may be tracked for the queues: dequeue latency and/or defer time. The dequeue latency corresponds to the time between a request being placed in and queue and being removed from the queue. The defer time corresponds to the time a deferred request waits on a deferred queue. Other statistics may also be tracked. Queue depth may also be tracked and utilized for request distribution purposes.

Figure 2:
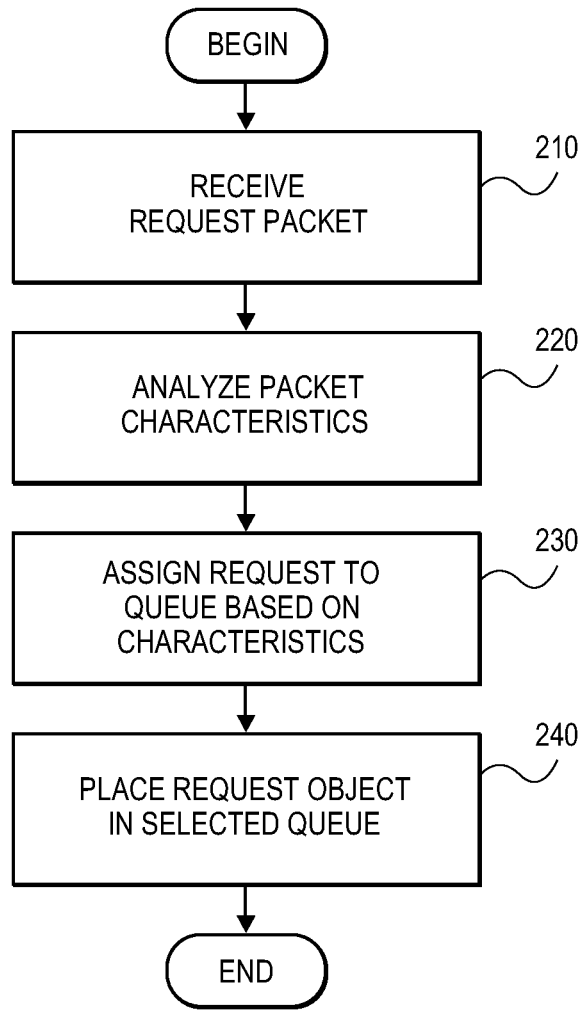
FIG. 2 is a flow diagram of one embodiment of a technique for queuing requests.

FIG. 2 is a flow diagram of one embodiment of a technique for queuing requests. The process of FIG. 2 may be applied, for example, in an environment as described above with respect to FIG. 1 and/or in a multitenant environment as described in greater detail below.

A packet including a request is received, 210. The packet includes metadata in addition to the request, which may be for database accesses (e.g., database queries) or for other resource requests. In one embodiment, one or more application servers are configured to receive service the requests and service requests using, for example, the queue structures described herein. Environments in which application servers may be utilized are described in greater detail below.

One or more characteristics of the packet may be analyzed, 220. In one embodiment, the one or more characteristics that are analyzed include metadata from a packet header. Other characteristics may also be analyzed for scheduling and/or queuing purposes. Metadata to be used may include, for example, organization information related to the request (e.g., organization identifier, organization category, organization type), request information (e.g., request type, request size, associated requests), priority information, and/or resource information, etc.

The request is assigned to a queue based on the characteristics that have been analyzed, 230. In one embodiment, the queues store objects representing the requests to be processed. In alternate embodiments, the requests and/or portions of the packet containing the request may be stored in the queues. The queues may be maintained in any manner known in the art. In one embodiment, three queues are maintained for each application server; however, in alternate embodiments, other numbers of queues may be maintained for the application servers.

Further, not all application servers are required to have the same number of queues. For example, one application server may have five queues with differing priorities while another application may have two queues with different priorities.

The object corresponding to the request is placed in the selected queue, 240. Once the object is placed in the queue, the process of FIG. 2 may be repeated for subsequent requests. One or more techniques for processing the objects in the queues are provided below.

Figure 3:
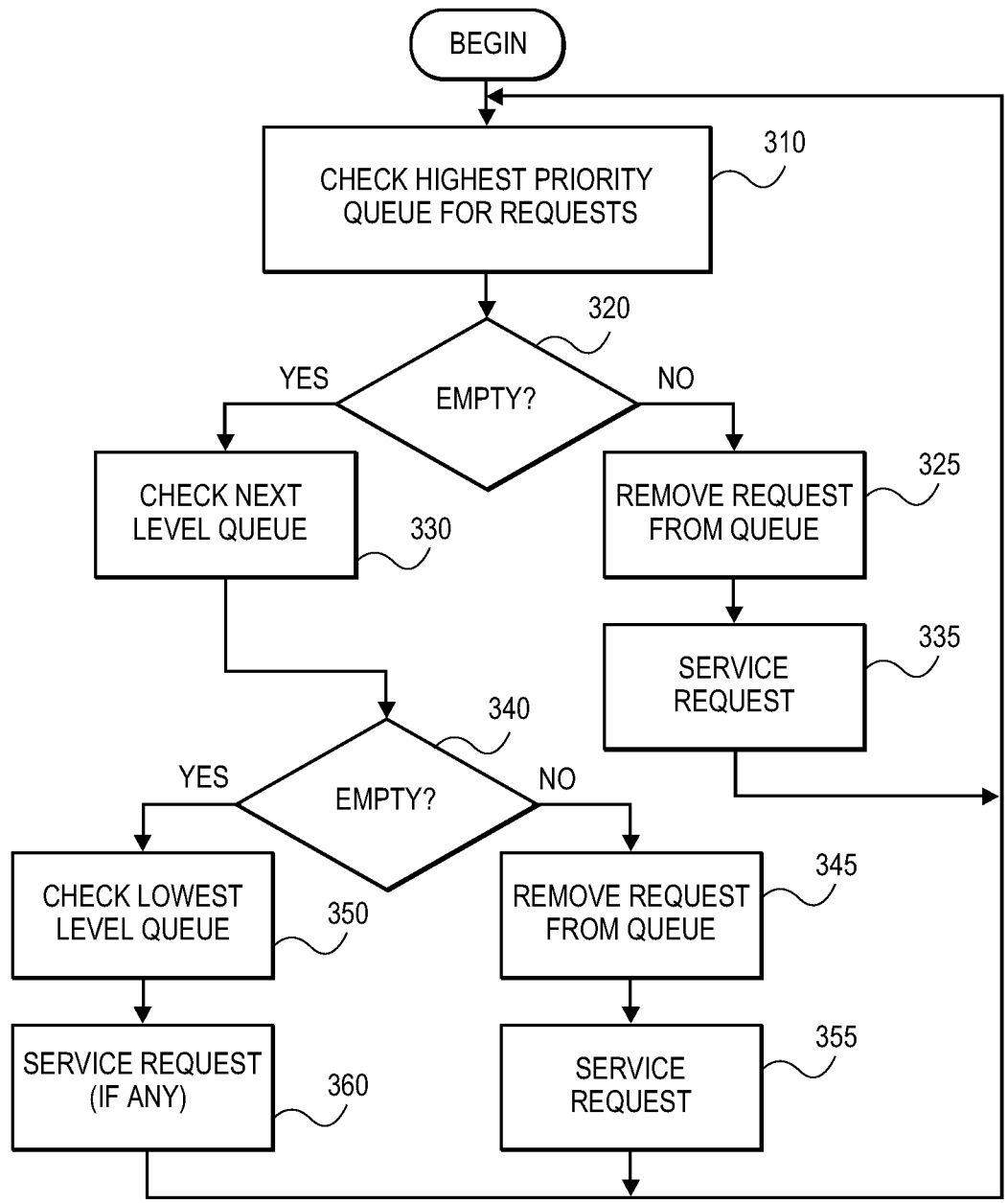
FIG. 3 is a flow diagram of one embodiment of a technique for processing queued requests.

FIG. 3 is a flow diagram of one embodiment of a technique for processing queued requests. The example of FIG. 3 assumes three priority levels associated with the queues; however, any number of priority levels may be supported. In the example of FIG. 3, the highest priority queue is serviced until empty, then the next highest priority queue is serviced until the highest level priority queue is no longer empty, etc. Other service strategies may also be supported.

The application server (or other system component) checks the highest priority queue for requests, 310. As described above, the queue structure may store the request, an object corresponding to the request, a packet containing the request, some or all of the relevant metadata, etc. The queue structure contains enough information to allow the application server to retrieve the request and service the request.

If the highest level queue is not empty, 320, the application server removes the request (or corresponding object, etc.) from the queue, 325 and services the request, 335. If the highest level queue is empty, 320, the application server (or other system component) checks the next level queue, 330.

If the next highest level queue is not empty, 340, the application server removes the request (or corresponding object, etc.) from the queue, 345 and services the request, 355. If the next highest level queue is empty, 340, the application server (or other system component) checks the lowest level queue, 350. Any requests found in the lowest level queue are than processed, 360.

Figure 4:
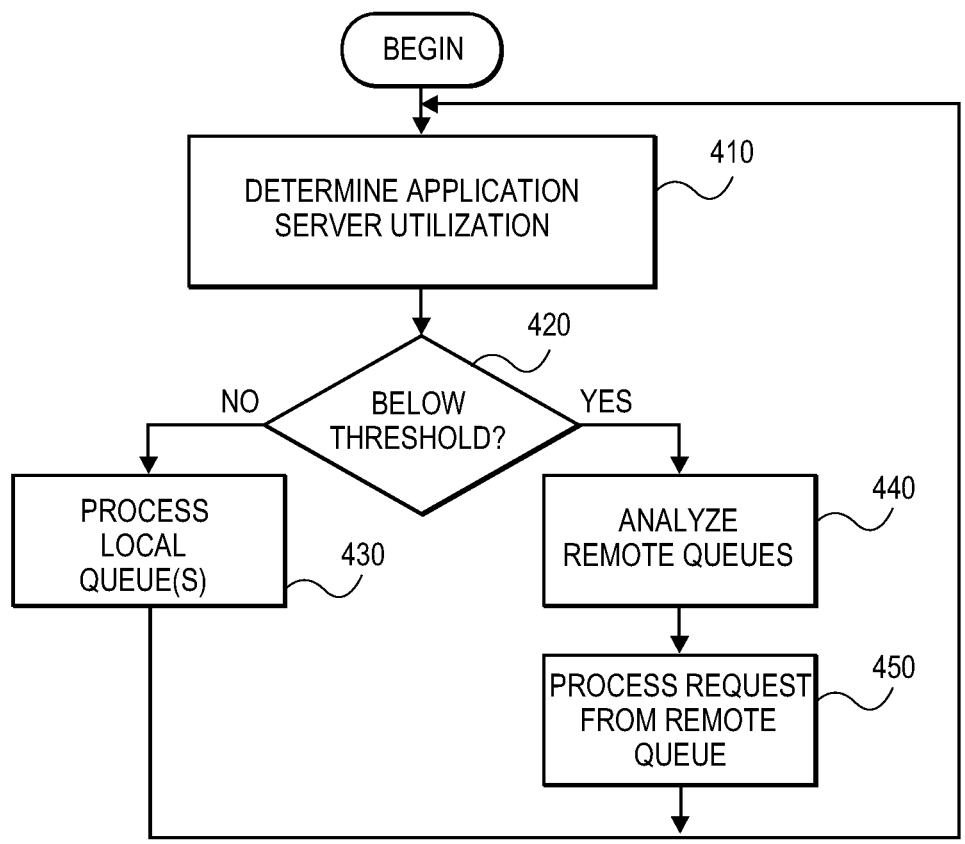
FIG. 4 is a flow diagram of one embodiment of a technique for service sharing between application servers.

FIG. 4 is a flow diagram of one embodiment of a technique for service sharing between application servers. The technique of FIG. 4 is but one embodiment of a strategy for sharing between application servers. In the examples described herein, there is no need to maintain a global state because states are determined based on interaction between application servers. That is, under certain conditions, application servers may reach out to other application servers and/or their corresponding queues to process higher priority requests, for example. This allows the application servers to independently manage service sharing.

Different application servers may utilize different techniques for reaching out. Thus, service sharing may be customized to provide improved system performance. The service sharing techniques may be used with or without the scheduling techniques discussed above. However, in one embodiment, the scheduling and queuing techniques are utilized with the service sharing techniques.

In one embodiment, an application server pushes information related to its utilization to another application server chosen at random. In one embodiment, this information is pushed at random intervals. Thus, over time, each application server may have information related to utilization of multiple (or all) other application servers. The application servers may maintain an internal directory of utilization information for other application servers. In one embodiment, more recent information is given more weight than older information. Utilizing this mechanism, an application server can compare its utilization as compared to other application servers, which may be used to provide a more efficient utilization of resources.

Application server utilization is determined, 410. In one embodiment, the application server includes mechanisms to monitor its own utilization. Example metrics for monitoring utilization include: queue depth, queue processing time, bandwidth utilization, processor utilization, memory utilization, etc.

The application server may also have an associated utilization threshold value that may be used to determine whether to reach out to other application servers. The threshold value may be a value corresponding to the individual metrics monitored, or may be a weighted value based on multiple metrics.

If the application server utilization is below the threshold, 420, the application server processes local queue(s), 430. This may be accomplished, for example, as described above. If the application server utilization is above the threshold, 420, the application server may analyze remote queues, 440. The remote queues are queues that directly feed other application servers. The application server can evaluate queue depth, utilization of a remote application server and/or other metrics to determine whether to process requests in queues corresponding to remote application servers.

When the application server identifies a remote queue for which requests can be processed, the application server may process those requests, 450. Thus, each application server may independently and proactively seek out requests to process to allow the overall system to more efficiently and effectively service incoming requests.

Figure 5:
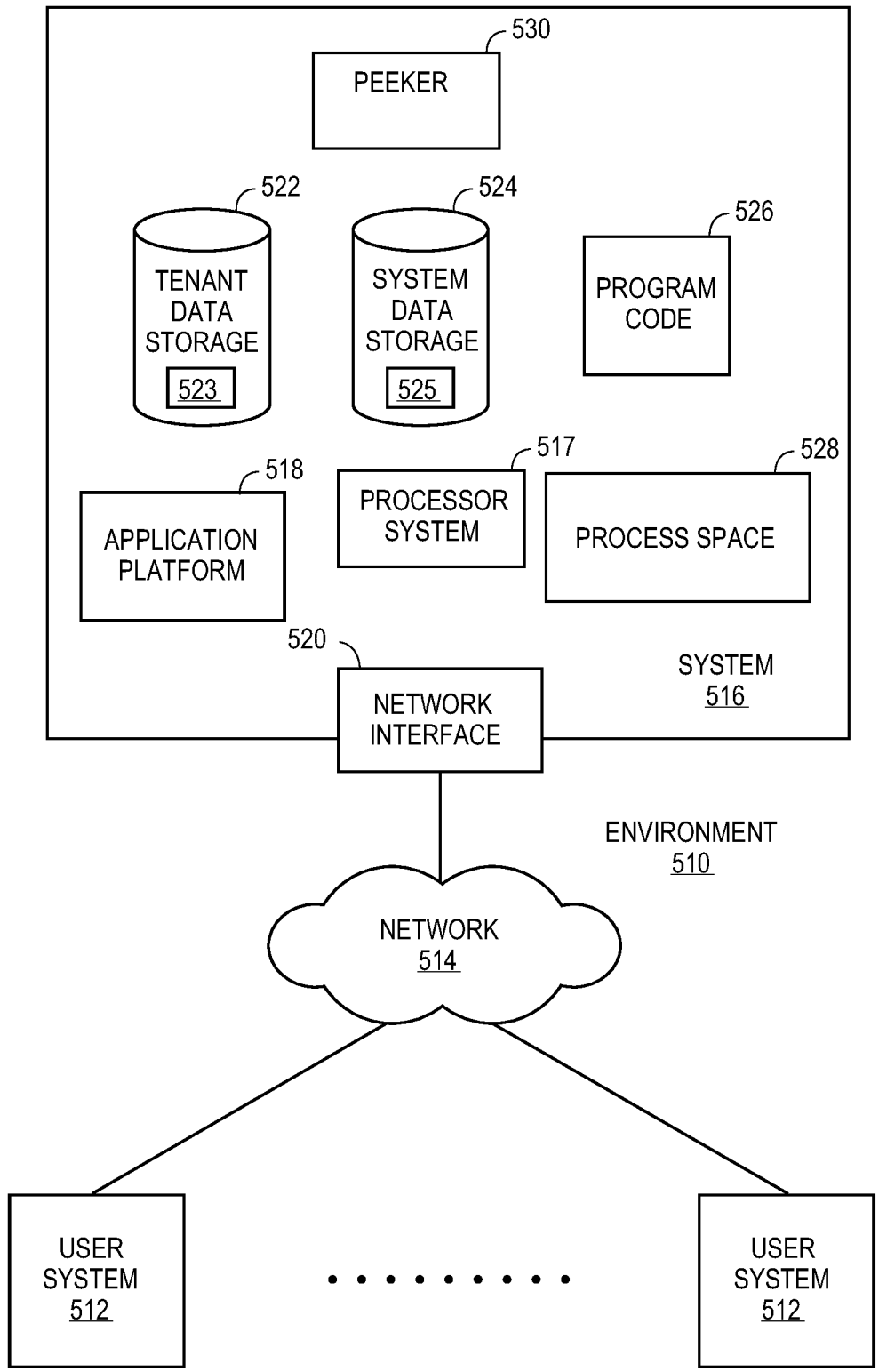
FIG. 5 illustrates a block diagram of an environment where an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein.

A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514.

Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
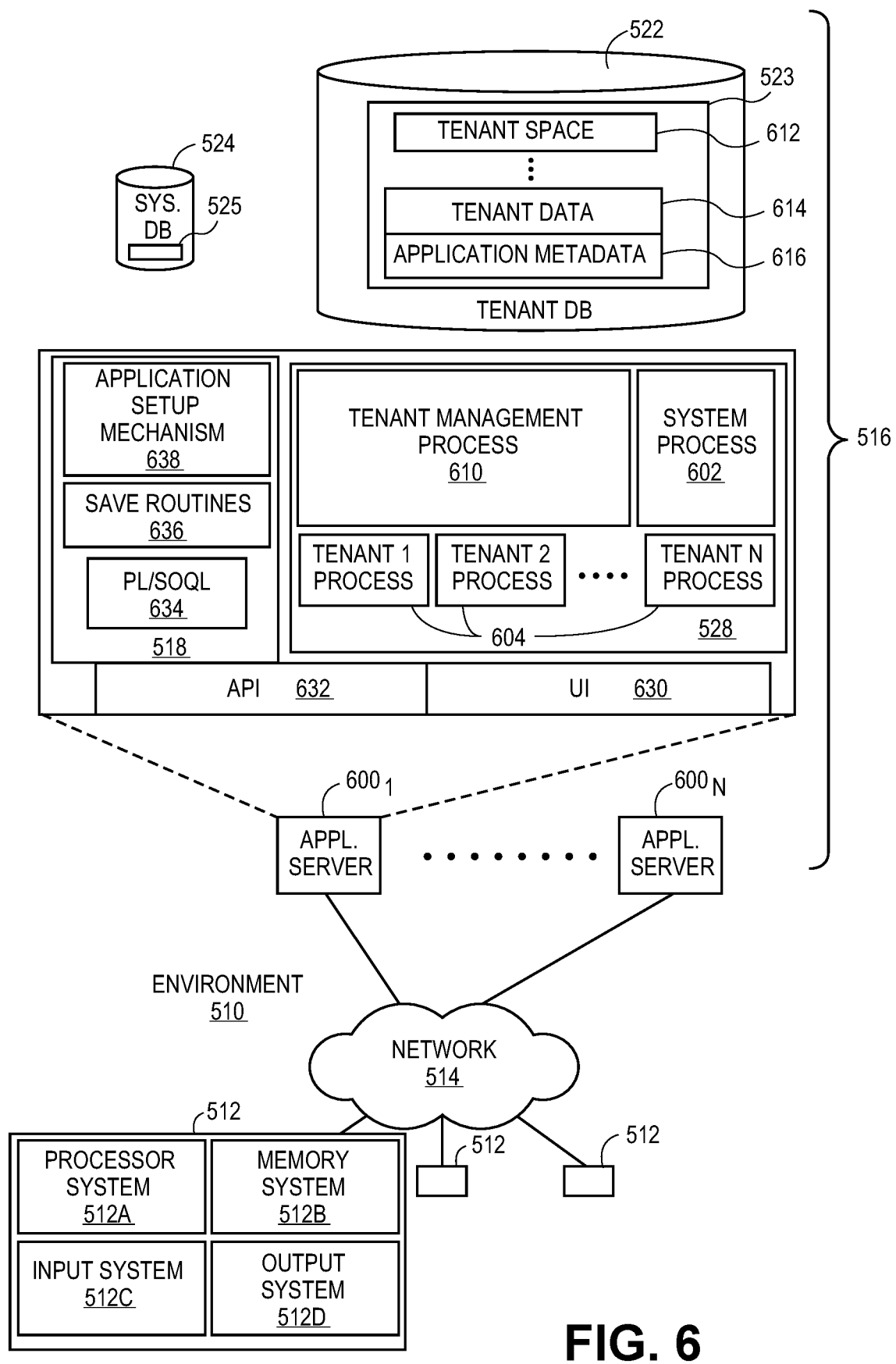
FIG. 6 illustrates a block diagram of an environment where an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers 6001-600N, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks.

As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632.

A detailed description of some PL/SOQL language embodiments is discussed in commonly owned co-pending U.S. Provisional Patent Application 40/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 6001 might be coupled via the network 514 (e.g., the Internet), another application server 600N-1 might be coupled via a direct network link, and another application server 600N might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600.

In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   employing, by one or more processors of an application server of a plurality of application servers, a traffic light metaphor to represent a utilization level of each of a plurality of resources of the application server by associating a traffic light of a plurality of traffic lights with each resource of the plurality of resources;
   maintaining, by the one or more processors, a mapping that associates a particular service request directed to the application server with a set of affected traffic lights of the plurality of traffic lights;
   facilitating, by the one or more processors, throttling of service requests directed to the application server that involve a resource of the plurality of resources that is under pressure by maintaining a deferred queue of a plurality of deferred queues for each traffic light of the plurality of traffic lights;
   responsive to receiving, by the one or more processors, a service request directed to the application server, adding directly or indirectly, based on a priority associated with the service request, the service request to a queue of a plurality of queues maintained in front of the application server; and
   servicing, by the one or more processors, service requests from the plurality of queues in accordance with a priority associated with each of the plurality of queues.

2. The method of claim 1, further comprising:
   determining, by the queue, states of the set of affected traffic lights for the service request based on the mapping;
   when a state of one or more traffic lights of the set of affected traffic lights for the service request is red, postponing the service request by directly or indirectly placing the service request on the deferred queue for a first traffic light of the one or more traffic lights; and
   when no state of any of the set of affected traffic lights for the service request is red, enqueueing the service request on the queue.

3. The method of claim 2, further comprising:
   maintaining, by the one or more processors, a directory of utilization information received from other of the plurality of application servers, wherein the directory facilitates identification of those of the other application servers of the plurality of application servers that are in a healthy state; and
   when a given deferred queue of the plurality of deferred queues meets a first handoff threshold or a particular service request on the given deferred queue meets a second handoff threshold, then removing the particular service request from the given deferred queue and forwarding the particular service request to one of the other application servers that is in the healthy state.

4. The method of claim 3, wherein the first handoff threshold comprises a predefined queue depth.

5. The method of claim 3, wherein the second handoff threshold comprises an expiration time/date.

6. The method of claim 2, further comprising:
   responsive to detecting, by the one or more processors, a state of a particular traffic light of the plurality of traffic lights is no longer red, pulling a next service request from a particular deferred queue of the plurality of deferred queues associated with the particular traffic light;

determining, by the one or more processors, states of the set of affected traffic lights for the next service request based on the mapping;

when a state of one or more traffic lights of the set of affected traffic lights for the next service request is red, continuing to postpone the next service request; and when no state of any of the set of affected traffic lights for the next service request is red, adding directly or indirectly the next service request to one of the plurality of queues maintained in front of the application server.

7. The method of claim 1, wherein said adding directly or indirectly, based on a priority associated with the service request, the service request to a queue of a plurality of queues maintained in front of the application server comprises adding an object associated with the service request to the queue.

8. The method of claim 7, wherein the object encapsulates metadata of the service request.

9. The method of claim 8, wherein the priority associated with the service request is determined based on the metadata of the service request.

10. The method of claim 1, wherein the plurality of resources include a connection pool, virtual machine memory, input/output (I/O) bandwidth, and processors.

11. An article comprising a non-transitory computer-readable medium having stored thereon instructions that when executed by one or more processors of an application server of a plurality of application servers are configurable to service requests by:

employing a traffic light metaphor to represent a utilization level of each of a plurality of resources of the application server by associating a traffic light of a plurality of traffic lights with each resource of the plurality of resources;

maintaining a mapping that associates a particular service request directed to the application server with a set of affected traffic lights of the plurality of traffic lights;

facilitating throttling of service requests directed to the application server that involve a resource of the plurality of resources that is under pressure by maintaining a deferred queue of a plurality of deferred queues for each traffic light of the plurality of traffic lights;

responsive to receiving a service request directed to the application server, adding directly or indirectly, based on a priority associated with the service request, the service request to a queue of a plurality of queues maintained in front of the application server; and servicing service requests from the plurality of queues in accordance with a priority associated with each of the plurality of queues.

12. The article of claim 11, further comprising instructions that, when executed by the one or more processors, cause the one or more processors to:

determine states of the set of affected traffic lights for the service request based on the mapping;

when a state of one or more traffic lights of the set of affected traffic lights for the service request is red, postpone the service request by directly or indirectly placing the service request on the deferred queue for a first traffic light of the one or more traffic lights; and when no state of any of the set of affected traffic lights for the service request is red, enqueue the service request on the queue.

13. The article of claim 12, further comprising instructions that, when executed by the one or more processors, cause the one or more processors to:

maintain a directory of utilization information received from other of the plurality of application servers, wherein the directory facilitates identification of those of the other application servers of the plurality of application servers that are in a healthy state; and when a given deferred queue of the plurality of deferred queues meets a first handoff threshold or a particular service request on the given deferred queue meets a second handoff threshold, remove the particular service request from the given deferred queue and forward the particular service request to one of the other application servers that is in the healthy state.

14. The article of claim 12, further comprising instructions that, when executed by the one or more processors, cause the one or more processors to:

responsive to detecting a state of a particular traffic light of the plurality of traffic lights is no longer red, pull a next service request from a particular deferred queue of the plurality of deferred queues associated with the particular traffic light;

determine states of the set of affected traffic lights for the next service request based on the mapping;

when a state of one or more traffic lights of the set of affected traffic lights for the next service request is red, continue to postpone the next service request; and when no state of any of the set of affected traffic lights for the next service request is red, add directly or indirectly the next service request to one of the plurality of queues maintained in front of the application server.

15. The article of claim 11, wherein said adding directly or indirectly, based on a priority associated with the service request, the service request to a queue of a plurality of queues maintained in front of the application server comprises adding an object associated with the service request to the queue.

16. An application server comprising:

a non-transitory storage device having embodied therein instructions; and one or more processors coupled to the non-transitory storage device and operable to execute the instructions to perform a method comprising:

employing a traffic light metaphor to represent a utilization level of each of a plurality of resources of the application server by associating a traffic light of a plurality of traffic lights with each resource of the plurality of resources;

maintaining a mapping that associates a particular service request directed to the application server with a set of affected traffic lights of the plurality of traffic lights;

facilitating throttling of service requests directed to the application server that involve a resource of the plurality of resources that is under pressure by maintaining a deferred queue of a plurality of deferred queues for each traffic light of the plurality of traffic lights;

responsive to receiving a service request directed to the application server, adding directly or indirectly, based on a priority associated with the service request, the service request to a queue of a plurality of queues maintained in front of the application server; and servicing service requests from the plurality of queues in accordance with a priority associated with each of the plurality of queues.

17. The application server of claim 16, wherein the method further comprises:

determining states of the set of affected traffic lights for the service request based on the mapping;

when a state of one or more traffic lights of the set of affected traffic lights for the service request is red, postponing the service request by directly or indirectly placing the service request on the deferred queue for a first traffic light of the one or more traffic lights; and when no state of any of the set of affected traffic lights for the service request is red, enqueueing the service request on the queue.

18. The application server of claim 17, wherein the method further comprises:

maintaining a directory of utilization information received from one or more application servers, wherein the directory facilitates identification of those of the one or more application servers that are in a healthy state; and when a given deferred queue of the plurality of deferred queues meets a first handoff threshold or a particular service request on the given deferred queue meets a second handoff threshold, then removing the particular service request from the given deferred queue and forwarding the particular service request to a second application server of the one or more application servers that is in the healthy state.

19. The application server of claim 17, wherein the method further comprises:

responsive to detecting a state of a particular traffic light of the plurality of traffic lights is no longer red, pulling a next service request from a particular deferred queue of the plurality of deferred queues associated with the particular traffic light;

determining states of the set of affected traffic lights for the next service request based on the mapping;

when a state of one or more traffic lights of the set of affected traffic lights for the next service request is red, continuing to postpone the next service request; and when no state of any of the set of affected traffic lights for the next service request is red, adding directly or indirectly the next service request to one of the plurality of queues maintained in front of the application server.

20. The application server of claim 17, wherein said adding directly or indirectly, based on a priority associated with the service request, the service request to a queue of a plurality of queues maintained in front of the application server comprises adding an object associated with the service request to the queue.

\* \* \* \* \*